United States Patent
Benson et al.

(10) Patent No.: US 11,232,059 B2
(45) Date of Patent: Jan. 25, 2022

(54) DOCKS FOR EXTERNAL GRAPHICAL PROCESSOR UNITS

(71) Applicant: Hewlett-Packard Development Company, L.P., Spring, TX (US)

(72) Inventors: Roger D. Benson, Spring, TX (US); Ho-sup Chung, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/049,055

(22) PCT Filed: Jul. 16, 2018

(86) PCT No.: PCT/US2018/042265
§ 371 (c)(1),
(2) Date: Oct. 20, 2020

(87) PCT Pub. No.: WO2020/018065
PCT Pub. Date: Jan. 23, 2020

(65) Prior Publication Data
US 2021/0240653 A1 Aug. 5, 2021

(51) Int. Cl.
*G06F 13/36* (2006.01)
*G06F 13/40* (2006.01)
(Continued)

(52) U.S. Cl.
CPC ...... *G06F 13/4068* (2013.01); *G06F 13/4221* (2013.01); *G06T 1/20* (2013.01); *G06F 2213/0026* (2013.01)

(58) Field of Classification Search
CPC .. G06F 13/00; G06F 13/4068; G06F 13/4221; G06F 2213/0026; G06T 1/20
See application file for complete search history.

(56) References Cited

U.S. PATENT DOCUMENTS 9,888,054 B2   2/2018  Yang et al.
2013/0132630 A1  5/2013  Sip
(Continued)

FOREIGN PATENT DOCUMENTS

CN  203561931 U  4/2014

OTHER PUBLICATIONS

Aorus GTX 1070 Gaming Box, Jun. 2017, Gigabyte Technology, 14 pages.
(Continued)

*Primary Examiner* — Tim T Vo
*Assistant Examiner* — Kim T Huynh
(74) *Attorney, Agent, or Firm* — Tong Rea Bentley & Kim LLC

(57) ABSTRACT

In example implementations, an apparatus is provided. The apparatus includes a first interface, an upstream device detector, a second interface, and a processor. The first interface receives a multi-channel connection. The upstream device detector is to detect a connection to external graphical processor unit (eGPU) via the first interface. The second interface is to connect a peripheral device that transmit data over the multi-channel connection via the first interface through the eGPU and to a host computer. The processor disables a portion of the multi-channel connection on the first interface when the upstream device detector detects the connection to the eGPU.

12 Claims, 4 Drawing Sheets

(51) Int. Cl.
G06F 13/42       (2006.01)
G06T 1/20        (2006.01)

(56)              References Cited

U.S. PATENT DOCUMENTS

| | | |
|---|---|---|
| 2014/0028689 A1 | 1/2014 | Teng |
| 2014/0129755 A1 | 5/2014 | Jadhav et al. |
| 2016/0117793 A1* | 4/2016 | Sierra ........................ G06T 1/20 345/502 |
| 2017/0103495 A1 | 4/2017 | Sierra et al. |
| 2020/0065934 A1* | 2/2020 | Tsukamoto ............. G06F 9/485 |

OTHER PUBLICATIONS

Node Lite, Apr. 2017, AKiTiO, 5 pages.
OWC Mercury Helios, Apr. 2017, OWC, 4 pages.
Razer Core V2, Oct. 2017, Razer, 7 pages.
RocketStor 6661 A, 2018, HighPoint Technologies 13 pages.

* cited by examiner

DOCKS FOR EXTERNAL GRAPHICAL PROCESSOR UNITS

BACKGROUND

The video demands for computing devices has increased over the years with more complex graphics associated with video games and video editing software. One option to improve the graphical processing capability of computing devices is to replace an internal graphical processor unit. Another option is to add additional graphical processing capability through an external graphical processor unit (eGPU). The eGPU may be connected through an interface on the computing device.

DETAILED DESCRIPTION

Examples described herein provide an apparatus and method for a dock for external graphical processor units (eGPUs). As discussed above, eGPUs can be connected to a computing device to add graphical processing capabilities. The eGPU can be connected through a high speed data interface on the computing device. However, some computing devices have a single high speed data interface. Thus, when the eGPU is connected to the high speed data interface, other peripheral devices cannot use the high speed data interface.

The eGPU has downstream connection interfaces. However, the firmware for the eGPU does not allow the connection interfaces to be used for high speed data connections due to bandwidth restrictions. The connection interfaces may be used for input devices such as a keyboard, a mouse, and the like.

Examples herein provide a dock that can be connected to the downstream connection interfaces of the eGPU. The computing device, the eGPU, and the dock can be daisy chained together. The dock may detect that the dock is connected to the eGPU downstream connection interface and disable portions of a high speed data connection. As a result, data can be transmitted to the computing device via the eGPU.

Figure 1:
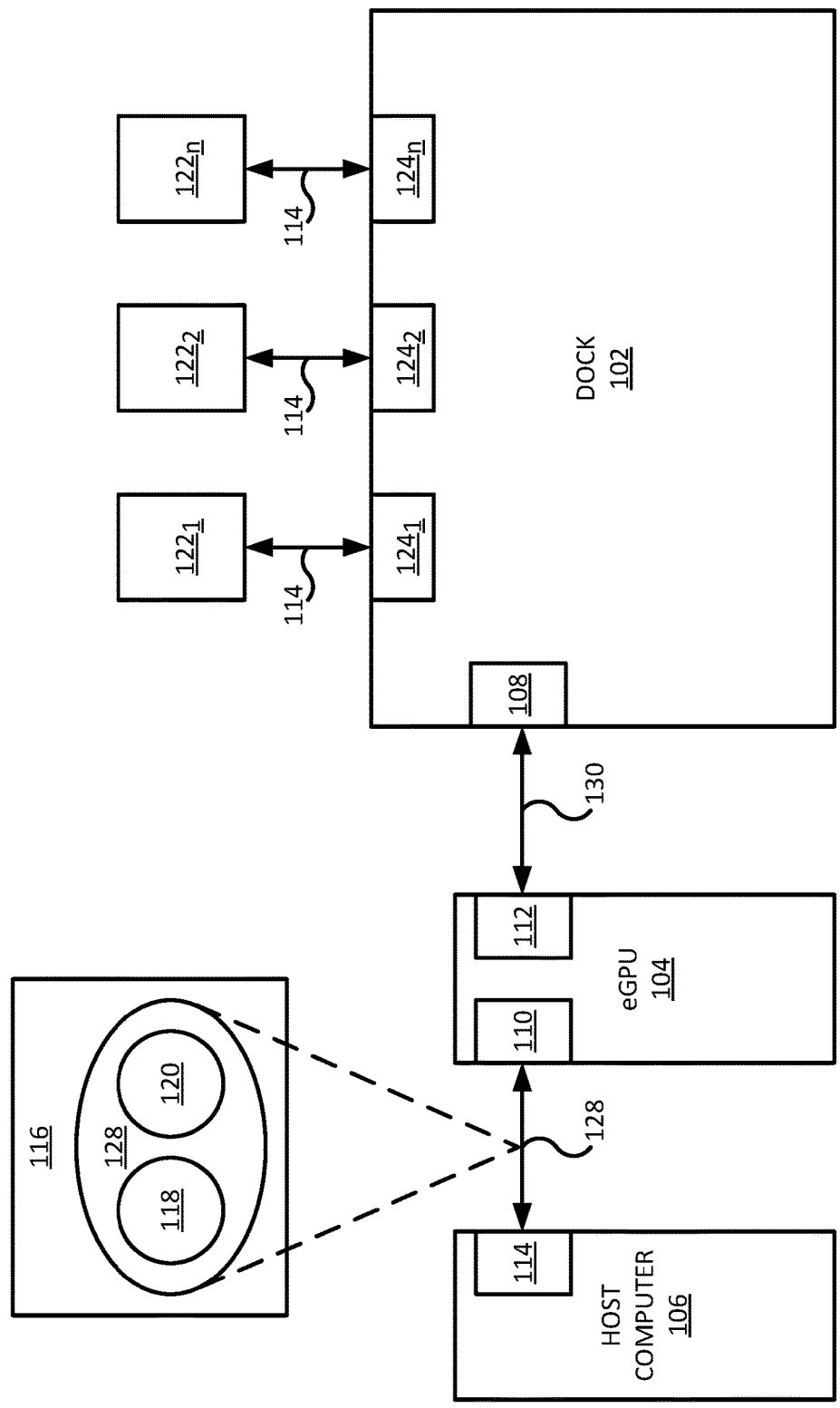
FIG. 1 is a block diagram of an example daisy-chained computing device, eGPU, and dock of the present disclosure.

FIG. 1 illustrates a block diagram of a system 100 of the present disclosure. In one example, the system 100 may include a dock 102, an external graphical processing unit (eGPU) 104, and a host computer 106. The dock 102 may include a first interface 108. The first interface 108 may be an interface to connect to upstream devices.

In one example, the dock 102 may include a second interface 124. In one example, the dock 102 may include a plurality of second interfaces $124_1$ to $124_n$ (also referred to herein collectively as second interfaces 124 or individually as a second interface 124). In one example, the second interface 124 may be an interface to connect to downstream devices. The downstream devices may be peripheral devices $122_1$ to $122_n$ (also referred to herein collectively as peripheral devices 122 or individually as a peripheral device 122). In one example, the peripheral devices 122 may be devices such as external memory devices, external optical drives, external audio devices, external network interface cards, audio codecs, and the like.

The first interface 108 and the second interface 124 may be high speed multi-channel communication interfaces. For example, the first interface 108 and the second interface 124 may be Thunderbolt or universal serial bus (USB) type-C interfaces.

The high speed multi-channel communication interface may have one channel for video data and a second channel for additional data. For example, one channel may be a display port or high definition media interface (HDMI) channel and a second channel may be a peripheral component interconnect express (PCIe) channel. In some examples, the high speed multi-channel communication interface may have two channels as display port channels.

In one example, the eGPU 104 may be an external graphical processor that provides additional graphical processing capabilities for the host computer 106. The eGPU 104 may provide an easy solution to upgrade the graphical processing capabilities of the host computer 106 without having to replace internal components of the host computer 106.

In one example, the eGPU 104 may be enclosed in a housing that includes an upstream interface 110 and a downstream interface 112. The upstream interface 110 may be a high speed multi-channel communication interface. For example, the upstream interface 110 may be a Thunderbolt or a USB type-C interface.

The downstream interface 112 may also be a multi-channel communication interface. For example, the downstream interface 112 may include a high speed multi-channel communication interface that includes a display port channel, an HDMI channel, a PCIe channel, a universal serial bus (USB) 2.0 connection, a USB 3.1 connection, an RJ-45 connection interface, and the like, for input/output devices (e.g., a keyboard and/or a mouse). For example, the dock 102 may be connected to the eGPU 104 via a multi-channel connection 130 between the downstream interface 112 and the first interface 108. However, some channels on the multi-channel connection 130 may be disabled to prevent bandwidth consumption that may affect the transmission of video data from the eGPU 104 to the host computer 106, as discussed in further details below.

In one example, the eGPU 104 may be connected to the host computer 106 via a multi-channel connection 128 via the interface 114 and the upstream interface 110. FIG. 1 illustrates a cross-sectional view 116 of the multi-channel connection 128. As noted above, a first channel 118 may be a display port channel. A second channel 120 may be a PCIe channel. The multi-channel connection 128 may also include additional display port channels or other channels to provide power over the multi-channel connection 128. In other words, the multi-channel connection 128 may carry different channels of high speed data in a single connection.

The host computer 106 may be any type of computing device. For example, the host computer 106 may be a desktop computer, a laptop computer, and the like. The host computer 106 is simplified for ease of explanation and may include additional components that are not shown (e.g., a display, input/output devices, a keyboard, a processor, a memory, and the like).

In one example, the host computer 106 may include an interface 114. The interface 114 may be a high speed multi-channel communication interface. For example, the interface 114 may be a Thunderbolt or a USB type-C interface.

The host computer 106 may have a single high speed multi-channel communication interface, or a very limited number of high speed multi-channel communication interfaces. Thus, when the eGPU 104 is connected to the interface 114 of the host computer 106, the dock 102 may be unable to connect to the host computer 106.

Currently, the eGPU 104 does not allow for downstream Thunderbolt or USB type-C connections due to bandwidth concerns. The video data from the eGPU 104 to the host computer 106 may consume most of the bandwidth of the multi-channel connection 128. If large amounts of data are transmitted from the dock 102 via the multi-channel connection 130 through the eGPU 104 and up to the host computer 106 via the multi-channel connection 128, the large amounts of data may consume too much bandwidth on the multi-channel connection 128. Consumption of the bandwidth on the multi-channel connection 128 may negatively affect the transmission of video data transmitted from the eGPU 104. In addition, video data cannot be throttled due to the fact that throttled video data may disrupt the quality of the image (e.g., dropped frames, lag, pixilation, and the like). Thus, the downstream interface 112 may not be used for Thunderbolt or USB type-C connections due to bandwidth concerns.

However, the present disclosure may modify the dock 102 such that the dock 102 may be connected to the downstream interface 112 with a high speed multi-channel connection (e.g., a Thunderbolt or USB type-C connection). For example, the display port channels in the multi-channel connection 130 may be disabled by the dock 102. As a result, non-video data may be transmitted over the PCIe channel of the multi-channel connection 130 between the dock 102 and the eGPU 104. The non-video data may be passed through the eGPU 104 to the host computer 106 via the multi-channel connection 128. For example, the non-video data may be passed through different channels such as channels that use USB 3.1 or 2.0 channels.

In one example, the non-video data may be throttled such that the data throughput rate through the eGPU 104 and to the host computer 106 can be adjusted as the available bandwidth of the multi-channel connections 128 and 130 varies depending on amount of video data that is sent by the eGPU 104.

In some examples, the eGPU 104 may also prevent video data from being passed through from the host computer 106 to the dock 102. For example, some data may travel downstream from the host computer 106 to the dock 102. As a result, more bandwidth may be available for the dock 102 to transmit data upstream through the eGPU 104 to the host computer 106 via the multi-channel connections 128 and 130.

Figure 2:
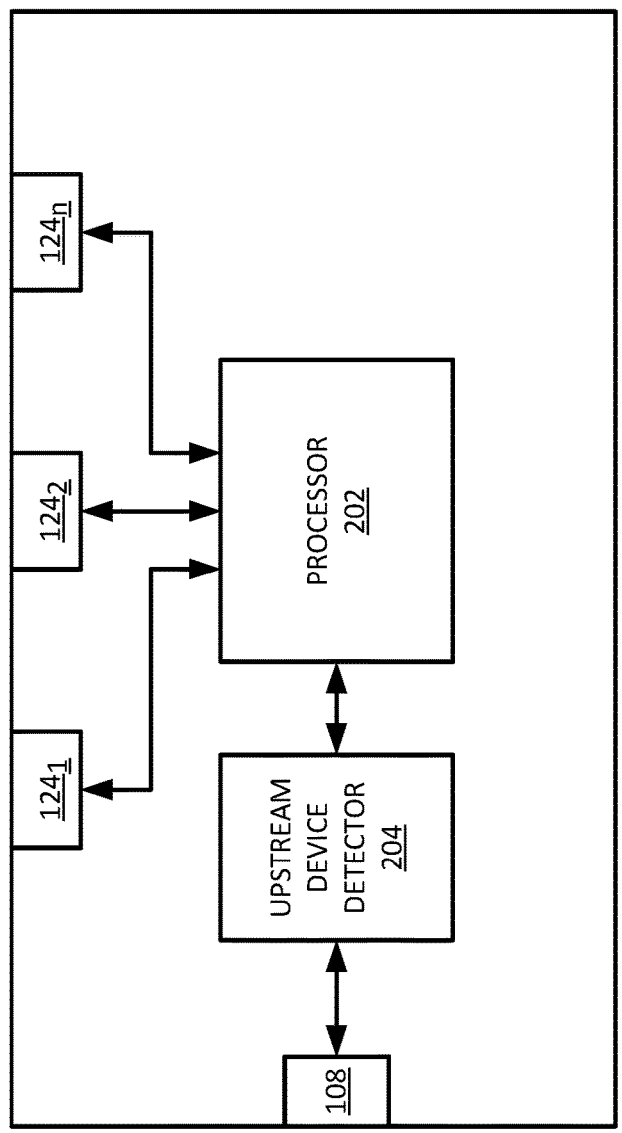
FIG. 2 is a block diagram of an example dock of the present disclosure.

FIG. 2 illustrates a block diagram of the dock 102. In one example, the dock 102 may include the first interface 108 and the second interface 124, as described above. As noted above, the first interface 108 and the second interface 124 may be high speed multi-channel communication interfaces. For example, the first interface 108 and the second interface 124 may be Thunderbolt or USB type-C interfaces.

In one example, the dock 102 may include a processor 202 and an upstream device detector 204. The processor 202 may be communicatively coupled to the second interface 124 and the upstream device detector 204. The upstream device detector 204 may include instructions executed by the processor 202 to detect a type of device that is connected upstream of the first interface 108.

The dock 102 may include additional components that are not illustrated. For example, the dock 102 may include an interface for connection to a power source, an interface for a display connection, an interface for an Ethernet connection, and the like.

As noted above, the upstream device detector 204 may detect a type of device that is connected upstream of the first interface 108. Based on the type of device that is connected, the processor may execute instructions to disable a channel of the first interface 108. For example, the channel may be a display port channel, or display port channels, of the multi-channel connection to the first interface 108.

For example, a device may be connected to the first interface 108. A connection signal may be sent to the upstream device detector 204. The upstream device detector 204 may initiate an exchange of initialization messages or control signals to the upstream device to determine what type of device is connected to the first interface 108. In one example, the messages may include identification information, such as a product identification of the device. The messages may request device information, and the upstream device may send the device information in response to the request.

In one example, the upstream device may be the host computer 106. If the upstream device is the host computer 106, then all channels of the multi-channel connection (e.g., the multi-channel connection 130) may be enabled and used to transmit data.

In one example, the upstream device may be detected to be the eGPU 104. When the upstream device detector 204 detects that the upstream device is the eGPU 104, the processor 202 may disable a portion of the multi-channel connection (e.g., the multi-channel connection 130) connected to the first interface 108. In one example, the portion that is disabled may be the display port channel or channels.

Figure 4:
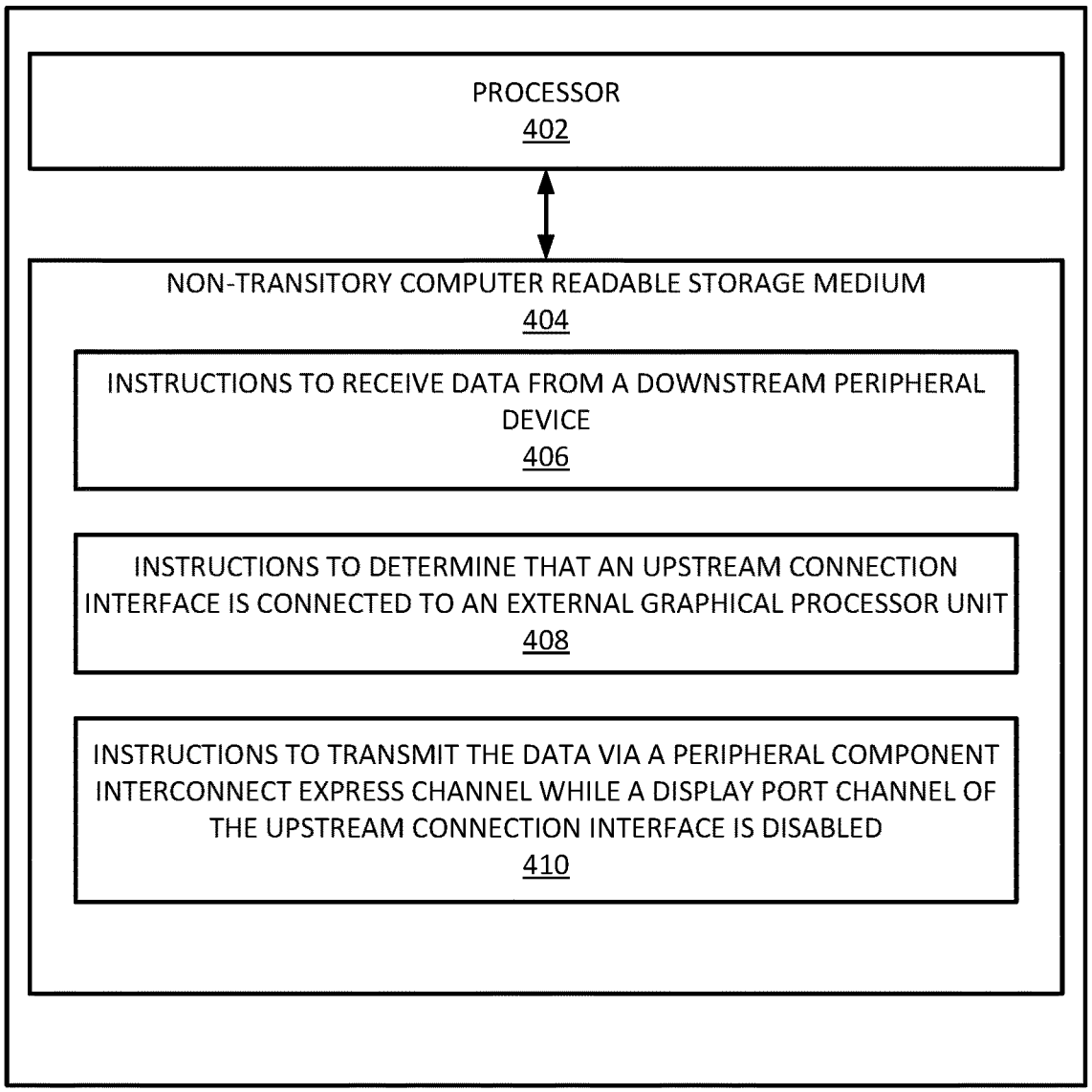
FIG. 4 is a block diagram of an example non-transitory computer readable storage medium storing instructions executed by a processor to transmit data to a computing device through a downstream connection on an eGPU.

In one example, the upstream device detector 204 and the instructions to disable a portion of the first interface 108 may be stored in memory (e.g., a non-transitory computer readable memory). An example of instructions stored in memory and executed by the processor 202 is illustrated in FIG. 4, and discussed below. In one example, the upstream device detector 204 and instructions to disable a portion of the first connection interface 108 may be downloaded to modify the dock 102. Thus, the dock 102 may be modified to add the upstream device detector 204 and the instructions to disable a portion of the first connection interface 108 to provide downstream high speed multi-channel connection capability to the dock 102 when connected to the eGPU 104. The upstream device detector 204 and the instructions to disable a portion of the first connection interface 108 may be downloaded from a remote server controlled and managed by a manufacturer of the dock 102.

Figure 3:
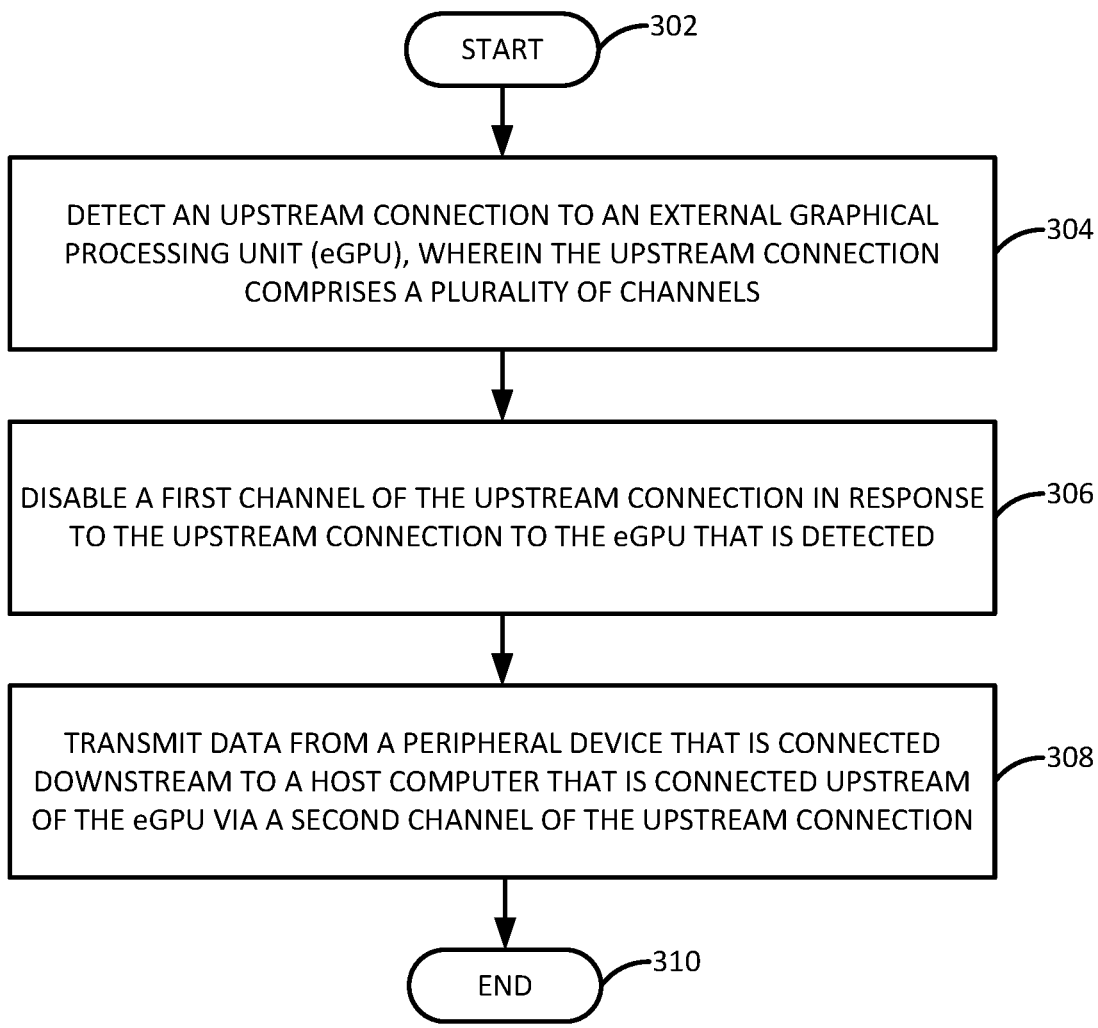
FIG. 3 is a flow chart of an example method for transmitting data to a computing device through a downstream connection on an eGPU.

FIG. 3 illustrates a flow diagram of an example method 300 for transmitting data to a computing device through a downstream connection on an eGPU. In an example, the method 300 may be performed by the dock 102 or the apparatus 400 illustrated in FIG. 4 and described below.

At block 302, the method 300 begins. At block 304, the method 300 detects an upstream connection to an external graphical processing unit (eGPU), wherein the upstream connection comprises a plurality of channels. For example, a first interface of a dock that connects to upstream devices may detect a connection. In response to the detected connection, a series of initialization messages may be exchanged to determine a type of device that is associated with the upstream connection. The messages may request identification information from the device, such as a product identification number, a product name, and the like. In one example, the device may be the eGPU.

In one example, the connection may be a multi-channel connection. For example, the multi-channel connection maybe a Thunderbolt or USB type-C connection. The channels of the multi-channel connection may include a display port channel and a PCIe channel.

At block 306, the method 300 disables a first channel of the upstream connection in response to the upstream connection to the eGPU that is detected. For example, the first channel may be the display port channel. In other words, the dock may disable the display port channel such that no video data can be transmitted upstream to the eGPU.

At block 308, the method 300 transmits data from a peripheral device that is connected downstream to a host computer that is connected upstream of the eGPU via a second channel of the upstream connection. The peripheral device may be an external memory device, an external optical device, an external network interface card, an audio codec, and the like. The peripheral device may be connected to the dock that is connected downstream from the host computer. The eGPU may be connected between the host computer and the dock that is connected to the peripheral device.

The data may be non-video data that is transmitted over the second channel. The second channel may be a PCIe data channel, a USB 3.1 data channel, a USB 2.0 data channel, and the like, that transmits the data.

In one example, the non-video data may be throttled based on an available amount of bandwidth on the second channel of the upstream connection (e.g., the multi-channel connection between the host computer and the eGPU). In other words, the dock may communicate with the eGPU to determine an amount bandwidth that is available on the second channel of the upstream connection.

In one example, the amount of bandwidth may be determined based on the amount of video data that is being transmitted from the eGPU to the host computer. The dock may then transmit the non-video data over the connection between the dock and the eGPU at the corresponding throughput rate. The non-video data may then be transmitted through the eGPU and to the host computer over the second channel of the upstream connection in accordance with the determined throughput rate. Thus, the amount of data or non-video data that is transmitted from the peripheral device may be dynamically changed based on the available bandwidth of the PCIe channel of the upstream connection between the host computer and the eGPU. At block 310, the method 300 ends.

FIG. 4 illustrates an example of an apparatus 400. In one example, the apparatus 400 may be the dock 102. In one example, the apparatus 400 may include a processor 402 and a non-transitory computer readable storage medium 404. The non-transitory computer readable storage medium 404 may include instructions 406, 408, and 410 that, when executed by the processor 402, cause the processor 402 to perform various functions to transmit data to a computing device through a downstream connection on an eGPU.

In one example, the instructions 406 may include instructions to receive data from a downstream peripheral device. The instructions 408 may include instructions to determine that an upstream connection interface is connected to an external graphical processor unit (eGPU). The instructions 410 may include instructions to transmit the data via a peripheral component interconnect express channel while a display port channel of the upstream connection interface is disabled.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a first interface to receive a multi-channel connection;
   an upstream device detector to detect a connection to an external graphical processor unit (eGPU) via the first interface;
   a second interface to connect a peripheral device that transmits non-video data over the multi-channel connection via the first interface through the eGPU and to a host computer; and
   a processor to disable a portion of the multi-channel connection on the first interface when the upstream device detector detects the connection to the eGPU to enable the peripheral device to transmit the non-video data over the multi-channel connection via the first interface through the eGPU and to the host computer, wherein the portion of the multi-channel connection that is disabled comprises a display port channel.

2. The apparatus of claim 1, wherein the first interface and the second interface comprise interfaces for a high speed multi-channel connection.

3. The apparatus of claim 2, wherein the high speed multi-channel connection comprises the display port channel and a peripheral component interconnect express channel.

4. The apparatus of claim 1, wherein the upstream device detector exchanges messages with the eGPU when initially connected to the first connection interface to detect the eGPU.

5. A method, comprising:
   detecting, by a processor, an upstream connection to an external graphical processing unit (eGPU), wherein the upstream connection comprises a plurality of channels;
   disabling, by the processor, a first channel of the upstream connection in response to the upstream connection to the eGPU that is detected to enable a peripheral device to transmit non-video data over the upstream connection through the eGPU and to a host computer, wherein the first channel of the upstream connection that is disabled comprises a display port channel; and
   transmitting, by the processor, the non-video data from the peripheral device that is connected downstream to the host computer that is connected upstream of the eGPU via a second channel of the upstream connection.

6. The method of claim 5, wherein the detecting comprises:
   detecting, by the processor, a connection to an upstream connection interface; and
   exchanging, by the processor, initialization messages to detect the eGPU.

7. The method of claim 5, wherein the transmitting comprises:
   detecting, by the processor, an available amount of bandwidth on the second channel of the upstream connection; and transmitting, by the processor, the non-video data at a throughput rate in accordance with the available amount of bandwidth on the second channel.

8. The method of claim 5, wherein the second channel comprises a peripheral component interconnect express channel.

9. A non-transitory machine-readable storage medium encoded with instructions executable by a processor, the machine-readable storage medium comprising:

instructions to receive non-video data from a downstream peripheral device;

instructions to determine that an upstream connection interface is connected to an external graphical processor unit (eGPU); and instructions to transmit the non-video data via a peripheral component interconnect express channel while a display port channel of the upstream connection interface is disabled to enable the downstream peripheral device to transmit the non-video data over the peripheral component interconnect express channel of the upstream connection interface through the eGPU to a host computer.

10. The non-transitory machine-readable storage medium of claim 9, comprising:

instructions to block video data on the display port channel that is passed through the eGPU.

11. The non-transitory machine-readable storage medium of claim 9, wherein the upstream connection interface comprises a Thunderbolt connection interface.

12. The non-transitory machine-readable storage medium of claim 9, further comprising:

instructions to dynamically change an amount of non-video data that is transmitted based on an available bandwidth on the peripheral component interconnect express channel.

* * * * *